(12) United States Patent
Klaassen et al.

(10) Patent No.: US 12,264,721 B2
(45) Date of Patent: Apr. 1, 2025

(54) LEAK CONTAINMENT ARRANGEMENT

(71) Applicant: Siemens Gamesa Renewable Energy A/S, Brande (DK)

(72) Inventors: Jacobus Klaassen, Voorburg (NL); Matthias Lenssen, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/208,827

(22) Filed: Jun. 12, 2023

(65) Prior Publication Data

US 2023/0407941 A1     Dec. 21, 2023

(30) Foreign Application Priority Data

Jun. 15, 2022   (EP) .................................. 22179234

(51) Int. Cl.
*F16F 15/023*   (2006.01)
*F03D 13/20*    (2016.01)

(52) U.S. Cl.
CPC ............ *F16F 15/023* (2013.01); *F03D 13/20* (2016.05); *F16F 2222/12* (2013.01); *F16F 2230/0023* (2013.01); *F16F 2230/24* (2013.01)

(58) Field of Classification Search
CPC ................. F16F 15/023; F16F 2222/12; F16F 2230/0023; F16F 2230/24; F03D 13/20
See application file for complete search history.

(56) References Cited

U.S. PATENT DOCUMENTS 10,161,387 B2 * 12/2018 Frydendal ............... F03D 80/80

FOREIGN PATENT DOCUMENTS

| CN | 104266065 B | 8/2016 | |
|---|---|---|---|
| CN | 212129200 U | 12/2020 | |
| DE | 4327444 A1 * | 2/1995 | ......... H05K 7/20645 |
| EP | 2889471 A1 | 7/2015 | |
| EP | 3048326 A1 * | 7/2016 | ............. F03D 80/00 |
| WO | WO 2019185448 A1 | 10/2019 | |

* cited by examiner

*Primary Examiner* — Audrey B. Walter
(74) *Attorney, Agent, or Firm* — Schmeiser, Olsen & Watts LLP

(57) ABSTRACT

A leak containment arrangement for a fluid damper in a wind turbine tower includes a receptacle arranged below the fluid damper; a fluid guide arranged between the fluid damper and the receptacle, which fluid guide is arranged to receive fluid from a leak in the damper and to guide the leaked fluid into the receptacle; and a sensing means arranged to detect fluid in the receptacle. Further provided is a method of providing leak containment for a fluid damper in a wind turbine tower.

15 Claims, 4 Drawing Sheets

LEAK CONTAINMENT ARRANGEMENT

CROSS-REFERENCE TO RELATED APPLICATIONS

This application claims priority to EP Application No. 22179234.4, having a filing date of Jun. 15, 2022, the entire contents of which are hereby incorporated by reference.

FIELD OF TECHNOLOGY

The following relates to a leak containment arrangement.

BACKGROUND

The tower of a wind turbine can oscillate when the wind turbine is in operation. The oscillation arises mainly from wind loading on the aerodynamic rotor, on the nacelle and on the tower itself, and wave loading can be a contributory factor in the case of an offshore wind turbine. The amplitude and frequency of oscillation are determined by the tower geometry, the tower's material properties and the mass of the load supported by the tower.

To avoid structural damage to the tower and to minimize fatigue, a wind turbine tower can be equipped with a damper to counteract or suppress the tower oscillations, for example a liquid damper installed in the upper level of the tower. One type of liquid damper is a slosh damper, which can be dimensioned to contain a large amount of liquid which is free to "slosh" back and forth. The liquid in the damper can be water, a brine solution, a mixture of water and various chemicals such as antifreeze, etc. The damper or "primary container" can comprise several tanks, each tank holding a volume of liquid. The damper can have an overall toroidal shape, with a central opening to allow power cables to extend from the generator to a lower tower region, and also to provide access between the tower and the nacelle.

A slosh damper for a tall wind turbine tower can have a total capacity in the order of 10,000-15,000 litres or more, with the liquid distributed equally over multiple primary containers or tanks. A multi-tank slosh damper can be relatively straightforward to install and to maintain. A "full-size" slosh damper has only a single primary container that is effectively as wide as the tower itself, with a capacity in the order of 10,000-15,000 litres or more. Such a full-size slosh damper can be significantly more effective at damping tower oscillations since it allows a very large quantity of liquid to move back and forth over the entire width of the primary container.

The operator of a wind turbine may be required to provide secondary containment, i.e. a vessel or container which is large enough to contain the entire quantity of damper liquid in the event of a leak to the damper. A secondary containment system serves to prevent chemicals used in the damper liquid from polluting the environment or damaging other components of the wind turbine, and also protects workers from being exposed to harmful substances. Depending on the applicable regulations and the number of primary containers, the secondary containment may be required to contain the total volume of damper liquid, or to contain up to 110% of the total volume of damper liquid.

The secondary containment system adds to the overall cost of installing a wind turbine. While it may be relatively straightforward to provide secondary containment for a damper with several primary containers, each holding only a fraction of the total volume of damper liquid, the expense of providing secondary containment for a full-size slosh damper can be prohibitive.

A secondary containment system can be a water-tight tank that is large enough to accommodate the slosh damper, e.g. a bund wall enclosing the slosh damper. Alternatively, the secondary containment system can be realised as a water-tight tank placed directly underneath the slosh damper, for example the secondary container may rest on a platform installed at a level underneath the damper. Apart from being costly to implement, these conventional secondary containment systems take up a lot of space inside the tower and can hinder accessibility and transfer of components through the tower interior. The conventional secondary containment systems also significantly increase the mass of the wind turbine's top section.

SUMMARY

An aspect relates to provide a reliable and economical secondary containment system for a full-size slosh damper.

The leak containment arrangement is intended for use with a liquid damper of the type described above, arranged at an upper level in a wind turbine tower. The expression "leak containment" and "leak response" may be used interchangeably herein.

According to embodiments of the invention, the leak containment arrangement comprises a receptacle arranged below the liquid damper; a liquid guide arranged between the liquid damper and the receptacle, which liquid guide is arranged to receive liquid from a leak in the damper and to guide the leaked liquid into the receptacle; and a means of detecting the presence of liquid in the receptacle.

Unlike a prior art secondary containment system, the receptacle of the inventive containment system can be small compared to the damper capacity. This is because of the liquid detection means, which can be configured to report the presence of liquid in the receptacle so that, for example, a repair procedure can be scheduled in time to prevent the leak from developing further. By collecting any leaked damper liquid and detecting the presence of leaked liquid in the receptacle, the tower damper does not need a full-size secondary containment tank. Instead, the capacity of the receptacle may be only 10%, more desirably only 1-2% of the damper capacity. For example, the primary container of a full-size slosh damper may be 14,000 litres, and the receptacle may be dimensioned to hold at most 1000-1500 litres, desirably as little as 100-200 litres.

A significant advantage of the inventive containment arrangement lies in its low production cost. Furthermore, any existing wind turbine with a liquid damper can be retrofitted with the inventive leak containment arrangement, with relatively little effort.

The inventive method provides leak containment for a liquid damper in a wind turbine tower and comprises the steps of arranging a receptacle below the liquid damper; arranging a guide between the liquid damper and the receptacle to receive liquid from a leak in the damper and to guide the leaked liquid into the receptacle; and detecting the presence of liquid in the receptacle.

Embodiments of the invention further describe a wind turbine comprising a tower supporting a nacelle; a liquid damper arranged in the upper level of the tower; and an embodiment of the inventive leak containment arrangement to collect liquid leaked from the damper in the event of a fault in the damper wall.

In the following, without restricting embodiments of the invention in any way, it may be assumed that the liquid damper is constructed as a toroid, i.e. the damper is an annular vessel with a central opening through which, for example, access is given between levels in the tower. A bundle of power cables may also pass through the central opening of the toroidal damper.

In the following, the term "fluid" shall be understood to mean "liquid". The expressions "fluid damper", "slosh damper" and "liquid damper" shall be understood to be synonyms and may be used interchangeably herein. Similarly, the expressions "liquid guide" and "fluid guide" may be used interchangeably.

The liquid damper can be realized as a stand-alone component that is assembled and arranged on a platform in an upper level of the tower. Equally, a section of the tower wall can also act as the outer wall of a toroidal damper. For example, if that portion of the tower wall is made of steel, the upper and lower surfaces of the damper can be welded directly to the tower wall. Alternatively, a toroid damper with square or rectangular cross-section can have an essentially vertical outer wall that is welded to the interior surface of the tower wall.

The purpose of the fluid guide is to catch any liquid that might escape from the damper in the event of a crack or other fault, for example a crack in a weld joint, a fissure in the damper housing, a damaged sealing, etc. No part of the damper extends beyond an edge of the fluid guide. Therefore, in a particularly exemplary embodiment of the invention, the surface area of the fluid guide, projected onto a horizontal plane, contains the projected surface area of the underside of the fluid damper. In other words, when the area of the fluid guide and the area of the damper's underside are projected onto the same horizontal plane, the fluid guide area is seen to "contain" the damper area. In the case of a conical fluid guide, the outer perimeter extends at least to the outer perimeter of the fluid damper. In this way, even if a crack develops in an outermost wall of the damper, for example in the region of a junction between tower wall and damper, any leaked fluid can be reliably collected.

The fluid guide can be made of any suitable material that provides a smooth run-off surface into the receptacle. For example, the run-off surface can comprise one or more sheets of a material such as polyethylene, polyvinylchloride, polypropylene, etc.

The run-off surface of the fluid guide is formed or shaped to create a funnel that leads downwards to the receptacle. Such a funnel is shaped so that at any point on the run-off surface, the surface inclines downward towards the receptacle. Liquid from a leak at any point in the damper will therefore travel downwards and into the receptacle.

A fluid guide can be made from a relatively lightweight and inelastic material and can have the shape of a funnel whose upper diameter corresponds essentially to the largest diameter of the fluid damper. The fluid guide can be suspended from various points on the tower wall using any suitable means, for example an arrangement of magnets, welded bushings, etc. Equally, an annular arrangement of hooks in the tower wall can serve as suspension points, and eyelets or other reinforced attachment points can be provided at corresponding intervals about the upper edge of the fluid guide. In the event of a leak, the leaked liquid should run downwards through the sloping surface of the funnel and into the receptacle.

In a possible embodiment of the invention, the leak containment arrangement can comprise a load sensor arrangement that can be used to estimate the severity of the leak. For example, a strain gauge, load cell or other suitable sensor can be arranged between the fluid guide and each suspension point. An increase in the measured load would indicate that fluid is dripping or flowing onto the fluid guide. Signals from the sensors can be analysed in a suitable processing unit, for example in a module of the wind turbine controller. The signal from a load cell should remain essentially constant, since a leak in the damper is a rare occurrence. A sudden decrease in load measured by a load sensor may indicate that the fluid guide has detached from the tower wall, and this can also be reported to the wind turbine controller.

Instead of a fluid guide in the shape of a single funnel with an outlet arranged over a single receptacle, the fluid guide can be shaped to form two or more funnel portions, and a receptacle can be arranged underneath each funnel outlet.

In a further embodiment of the invention, the fluid guide comprises a weight-bearing support structure and a run-off surface, wherein the run-off surface is carried by the support structure. In this embodiment, the fluid guide is realized as an essentially two-part component comprising the run-off surface and the weight-bearing support structure. The support structure can for example be a nylon rope mesh or "fisher net", knotted in the form of a funnel or cone, with an upper diameter that corresponds essentially to the diameter of the fluid damper. The mesh is constructed to bear the weight of the run-off surface as well as any liquid from a possible leak. The run-off surface can be made from one or more sheets of flexible material such as PVC sheeting, and can lie on the support structure. An advantage of such a realisation is that the mesh can be easily attached to the tower wall, for example it can be suspended from an annular arrangement of hooks placed at intervals in the tower wall directly underneath the fluid damper. Another significant advantage of this approach is that the run-off surface does not need to bear any weight, allowing it to be made from a light and economical material, for example any lightweight plastic that is impervious to the damper liquid.

Generally, it has been observed that a leak in a wind turbine slosh damper starts off as a small crack at some location in the damper wall. This crack may gradually increase in length, and the rate of increase will be determined primarily on the loads acting on the wind turbine tower and damper. The rate of crack growth in fluid dampers of the type described herein has been observed to be very slow, especially in the early stages. Therefore, liquid from a damper leak will collect quite slowly in the receptacle below the fluid guide. However, the time between maintenance routines may be long, especially in the case of an offshore wind turbine, so that the leaked liquid may fill the receptacle before a maintenance crew arrives. Therefore, in a further embodiment of the invention, the leak containment arrangement comprises a fluid return means for returning any collected fluid to the damper. For example, in an embodiment of the invention, a thin tube or "return line" can lead from the receptacle upwards to the top of the fluid damper, where it is attached to an inlet or other opening in the damper. Liquid can be transferred from the receptacle to the damper by any suitable means, for example using a hydraulic device, a vacuum device, etc. However, in an embodiment of the invention, the fluid return means comprises a pump arranged to convey the leaked liquid from the receptacle through the return line and back to the damper. The pump can have a suitable pumping capacity, for example one litre per second. An advantage of such an embodiment is that any liquid from a leak in the damper can be collected reliably and prevented from reaching the environment. Any fluid from a leak in the damper can be collected in the receptacle and returned to the damper. Of course, fluid from the damper will continue to escape through the leak, so that the fluid return means of the inventive containment arrangement essentially circulates the leaked fluid until such time as the leak in the damper can be repaired.

In an embodiment of the invention, the sensing means is realised as a level sensor that is arranged to monitor the level of liquid accumulated in the receptacle. For example, in an embodiment of the invention, the level sensing means can be realized as a mechanical float that issues a signal when it is raised above a default liquid level. Liquid dripping or flowing into the receptacle will raise the float. In an embodiment of the invention, such a mechanical float can be configured to actuate the pump or trigger an alarm when it is raised above the default or "empty" level. The "empty" or default liquid level can be a few millimetres, for example water from condensation inside the tower may accumulate in the receptacle if an air-conditioning arrangement is without power. The collected condensation will ultimately evaporate again without the need to issue an alarm or activate the pump.

A signal issued by the level sensing means is used to actuate the pump, for example a controller can switch on the pump as long as the level sensing means reports that the liquid in the receptacle exceeds a predefined level threshold. To this end, the leak containment arrangement also comprises a means of communicating with a controller such as the wind turbine controller. When the liquid level in the receptacle reaches the predefined threshold, a signal issued by the level sensing means is detected by the controller, which can then actuate the pump. The wind turbine controller may also inform the wind turbine operator, so that a maintenance crew can be organized to repair the leak.

As explained above, the intervals between scheduled maintenance routines can be long, for example several months. In a worst-case scenario, the damper may develop a leak directly after a scheduled maintenance routine, and the severity of the leak may be such that the capacity of the fluid return means is insufficient to prevent the receptacle from overflowing. Therefore, in an embodiment of the invention, the leak containment arrangement is configured to issue an alarm when the level of liquid in the receptacle rises faster than a "safe" rate. The alarm can be reported to the wind turbine operator, so that a maintenance crew can be organized within a brief time.

According to an alternative or additional aspect a system for repairing a structure, housing, and/or compartment of a fluid damper is disclosed. This system comprises a fluid damper being arranged in a tower of a wind turbine, and an auxiliary holding device having an inner volume for taking in at least a portion of a fluid of the fluid damper.

The auxiliary holding device is further configured for being arranged at least partially, desirably entirely, within an inner volume of the fluid damper for replacing the fluid damper's functionality of holding the damper fluid. The auxiliary holding device is at least partially constructed from a flexible structure such that it can be placed within the inner volume of the fluid damper and is then subsequently configured to expand for taking in the fluid of the fluid damper. For example, the auxiliary holding device is designed as a foldable and/or expandable housing which increases its inner volume when being filled up with the damper fluid. In particular, the auxiliary holding device is a flexible bag.

According to an embodiment of the aspect, the auxiliary holding device may have a first operational status, desirably a transportation status for transportation and mounting/dismounting purposes, wherein the inner volume of the auxiliary holding device is at a minimum (minimum inner volume of the auxiliary holding device). Furthermore, the auxiliary holding device has a second operational status, desirably an engagement status, wherein the inner volume of the auxiliary holding device is larger than the minimum inner volume and can be extended to a maximum inner volume of the auxiliary holding device.

According to an embodiment of the alternative or additional aspect, the auxiliary holding device has a maximum inner volume for essentially entirely holding an entirety of the damper fluid. Hence, the auxiliary holding device has a maximum inner volume such, that—when filled up—essentially no damper fluid remains outside of the auxiliary holding device.

According to a further embodiment of the aspect, the liquid damper is realised as a toroid damper and comprises a damper housing formed from a horizontal lower annulus or base-plate, a horizontal upper annulus or top-plate, an essentially cylindrical outer vertical wall and an essentially cylindrical inner vertical wall; and wherein the width of the damper housing corresponds to the interior width of the tower. The fluid damper contains an operational volume of liquid, i.e. the quantity of liquid required to achieve the desired damping effect at the target natural frequency when the damper is installed in a wind turbine tower. Accordingly, the maximum inner volume of the auxiliary holding device is configured to at least entirely contain the operational volume. The operational volume is smaller or not larger than the maximum inner volume of the fluid damper, thus, essentially the entirety of the operational volume is contained by the auxiliary holding device and essentially no damper fluid remains outside of the auxiliary holding device, and/or the entirety of the damper fluid is arranged within the inner volume of the fluid damper.

At least one of the precedingly described embodiments of the additional or alternative aspect enables the effect that any repair or maintenance measure of the structure of the fluid damper can be executed from an inside of the fluid damper and/or on an inner surface of the fluid damper. For example, if the structure of the fluid damper has a defect such as a leakage, the opening of the leakage can be closed by suitable measures, e.g. grinding, cleaning, welding, and/or surface treatment, without removing the damper fluid out of the inner volume of the fluid damper. In fact, by applying this disclosure the damper fluid does not need to be pumped out of the fluid damper and no additional outside container for temporarily holding the damper fluid is needed to be provided outside of the fluid damper and possibly within the wind turbine. This results in reducing down time of the wind turbine and no extra space is required to be reserved in or at the wind turbine for this temporary fluid container.

According to an embodiment, the overall inner volume of the fluid damper is larger than the maximum volume of the damper fluid. This supports the fact, that the entirety of the damper fluid can be taken in by the auxiliary holding device while leaving a certain volume of the fluid damper essentially without damper fluid. This certain volume without fluid damper essentially is a dry volume of the fluid damper, and service and maintenance tasks as described can be performed in this dry volume.

According to an embodiment of the aspect, the auxiliary holding device comprises a plurality of auxiliary holding containers, desirably flexible holding backs.

In the context of the additional or alternative aspect a pumping arrangement is provided comprising at least one pump and at least one the fluid duct for being directly or indirectly connected to the auxiliary holding device. For this purpose, the auxiliary holding device may have an intake for connecting the pump, wherein the pump is configured for transporting damper fluid arranged within the inner volume of the fluid damper into the inner volume of the auxiliary holding device.

In accordance with the additional or alternative aspect, a method for operating a system according to at least one embodiment of the additional or alternative aspect is disclosed, wherein the method comprises the following steps (not necessarily but desirably in this order): providing at least one auxiliary holding device to the fluid damper, in particular wherein the auxiliary holding device being in the first operational status; transporting at least a portion of the damper fluid from the inner volume of the fluid damper into the inner volume of the auxiliary holding device, in particular at least partially transforming the auxiliary holding device from the first operational status into the second operational status; arranging the auxiliary holding device at least partially, desirably entirely, in the inner volume of the fluid damper; continuing to transport damper fluid from the inner volume of the fluid damper into the in the volume of the auxiliary holding device such that essentially no damper fluid remains outside of the inner volume of the auxiliary holding device; and in particular, conducting a maintenance measure and/or service measure task within the inner volume of the fluid damper, desirably grinding, cleaning, welding, and/or surface treatment of an inner surface of the inner volume of the fluid damper, without removing the damper fluid out of the inner volume of the fluid damper.

According to a further aspect, a method of operating a wind turbine comprising a system according to at least one of the embodiments of the additional or alternative aspect as disclosed is described herein, wherein the method comprises the following steps: conducting the method for operating the system according to at least one embodiment of the alternative or additional aspect; generating, by wind turbine, electrical power and/or electrical energy; transmitting at least a part of the electrical power and/or of the electrical energy to an electrical receiving arrangement not positioned in international waters, in particular positioned on land, onshore; and supplying at least a part of the electrical power and/or of the electrical energy to a utility grid, in particular onshore utility grid.

BRIEF DESCRIPTION

Some of the embodiments will be described in detail, with reference to the following figures, wherein like designations denote like members, wherein.

DETAILED DESCRIPTION

Figure 1:
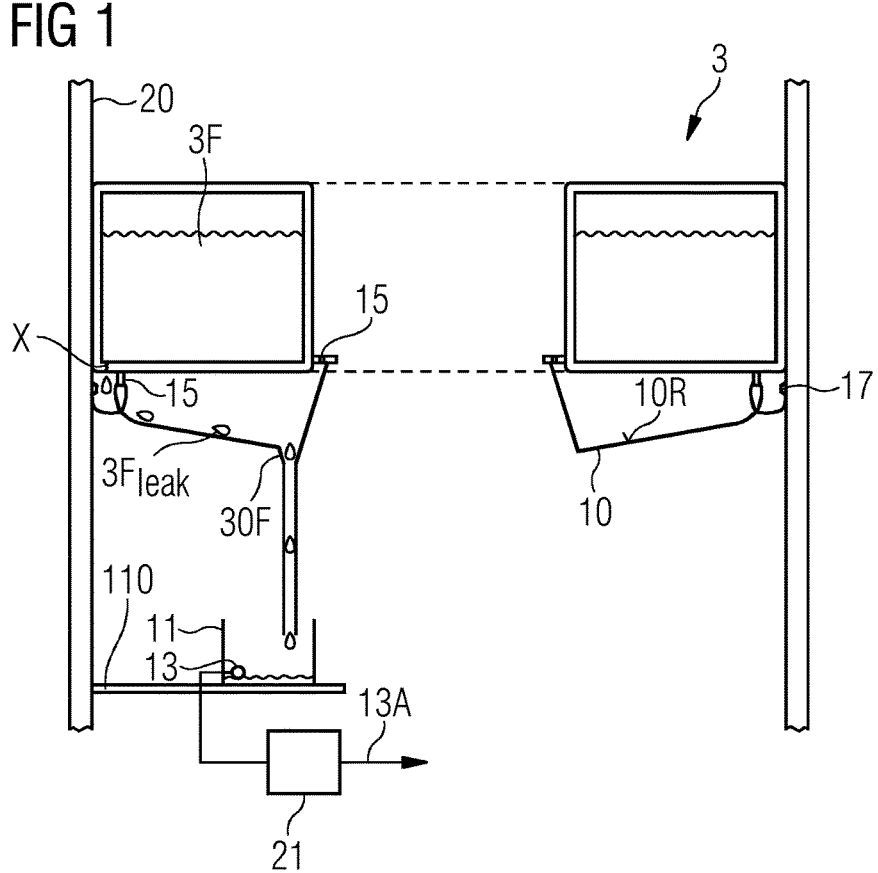
FIG. 1 shows an embodiment of a leak containment arrangement.

FIG. 1 shows a schematic cross-section through a wind turbine tower 20, showing a liquid damper 3 arranged at an upper level in the tower 20 (other components of the operational wind turbine, such as the nacelle, generator etc., are not shown). In an exemplary embodiment, the outer diameter, the inner diameter, and the height of the slosh damper can be 6 m, 3.5 m, and 1.5 m respectively. The capacity of the damper 3 can be in the order of 15 $m^3$ (15,000 litres) or even more. The wind turbine operator may be required by locally applicable regulations to provide a secondary containment for the damper 3 so that liquid leaking from the damper 3 can be collected.

To fulfil these requirements, the wind turbine tower 20 has been equipped with an embodiment of the inventive leak containment arrangement 1.

The leak containment arrangement 1 comprises a receptacle 11 and a fluid guide 10 arranged between the fluid damper 3 and a receptacle 11. The fluid guide 10 is arranged to receive liquid originating from a leak X in the damper 3 and to guide the leaked fluid into the receptacle 11. The receptacle 11 can be small compared to the damper capacity. For example, the receptacle 11 may be dimensioned to hold at most 10%, more desirably at most 1-2% of the liquid contained in the damper 3.

The diagram shows one mode of realizing the fluid guide 10. In this embodiment, the fluid guide 10 is realised as an annular catchment surface suspended underneath the toroidal damper 3. The fluid guide 10 is secured underneath the damper 3, for example using magnets 17 between the outer edge of the fluid guide 10 and the tower wall, and suspension points 15 at suitable positions on the damper 3. The lowest point of the fluid guide 10 is a funnel that opens into the receptacle 11.

The diagram indicates a level sensor 13 arranged to monitor the level of liquid in the receptacle 11. When the liquid level reaches a predefined threshold 12L, a signal 13S from the sensor 13 is sent to a processing module, for example the wind turbine controller 21 (indicated here schematically), which in turn can issue an alarm 13A to the wind turbine operator so that a repair crew can be sent to the wind turbine in order to repair the leak X in the damper 3.

The inventive secondary containment system 1 has a significantly lower weight compared to a welded steel tank as known from the prior art, with a capacity that is the same (or larger) than the slosh damper 3. The inventive secondary containment system 1 is also considerably cheaper than the prior art solutions and can be installed in a favourably brief time.

Figure 2:
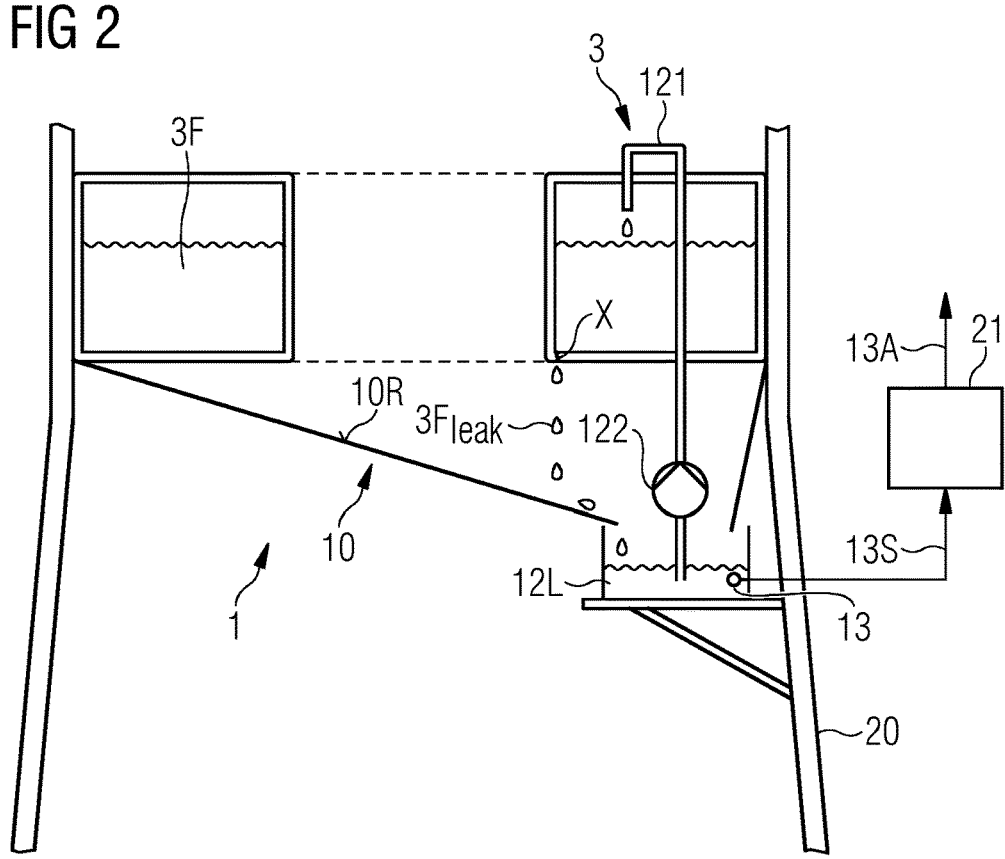
FIG. 2 shows another embodiment of a leak containment arrangement.

FIG. 2 shows another exemplary embodiment. Here, the fluid guide 10 has the shape of an asymmetrical downward-pointing cone with an opening arranged over the receptacle 11. Any leaked liquid $3F_{leak}$ runs down the upper surface or run-off surface 10R of the fluid guide 10, and into the receptacle 11. The diagram also shows a fluid return means provided for this exemplary embodiment. The fluid return means comprises a return line 121 and a pump 122, for returning any collected fluid $3F_{leak}$ to the damper 3. The diagram indicates the general asymmetric shape of the fluid guide 10, which shall be understood to be shaped to include a central "passage" to accommodate at least the power cables.

Similar to the embodiment of FIG. 1, the diagram indicates a level sensor 13 arranged to monitor the level of liquid in the receptacle 11. When the liquid level reaches a predefined threshold 12L, an appropriate signal 13S can be issued by the sensor 13.

Figure 3:
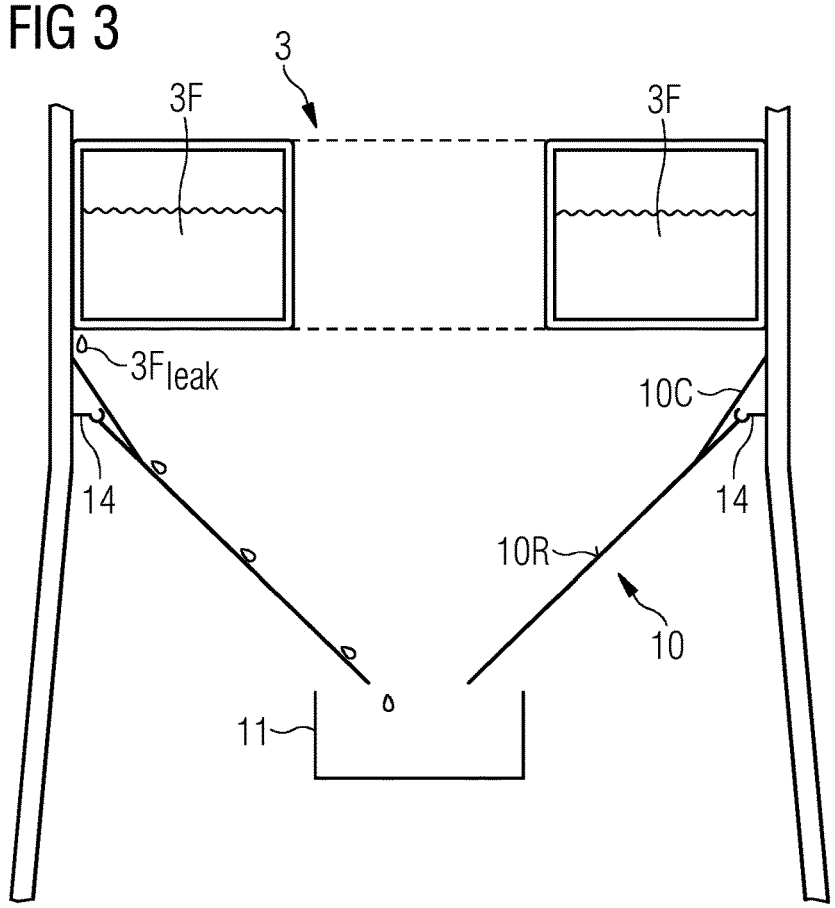
FIG. 3 shows a top-down view of an embodiment of the leak containment arrangement.

A further option is illustrated in FIG. 3. Here, in addition to the conical run-off surface illustrated in FIG. 1, the fluid guide 10 comprises an additional collar 10C or "curtain"

arranged between the tower wall and the run-off surface 10R, to ensure that any liquid originating very close to the tower wall will also be guided onto the run-off surface 10R of the fluid guide 10. The upper edge of this collar 10C can be taped, riveted, stapled, or otherwise attached to the tower interior surface. The upper edge of the conical portion can be connected to the tower wall in any suitable manner, for example by means of an annular arrangement of hooks 14 or other fasteners. The outer edge of the fluid guide 10 can be provided with eyelets 1 or loops to facilitate attachment to the hooks 14.

The collar 10C can be shaped such that its lower edge is below the level of the suspension points 14, so that the lower edge of the collar 10C reaches the run-off surface 10R of the fluid guide 10. The leak containment arrangement 1 may be assumed to also comprise a fluid return means as shown in FIG. 1. Here also, the diagram indicates the general asymmetric shape of the fluid guide 10, which shall be understood to be shaped to include a central "passage" to accommodate at least the power cables.

Figure 4:
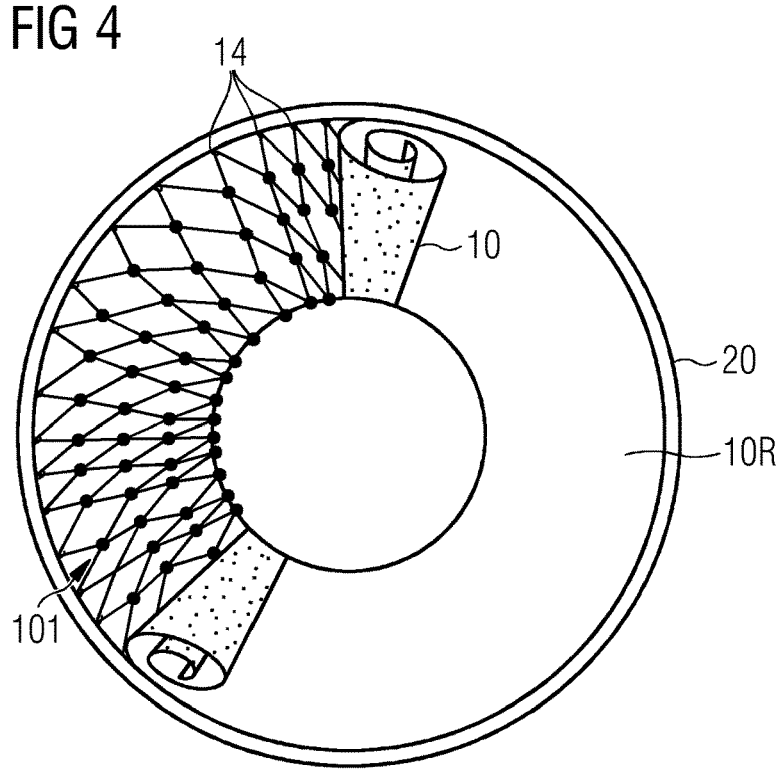
FIG. 4 shows a vertical cross-section view of an embodiment of the leak containment arrangement.
Figure 5:
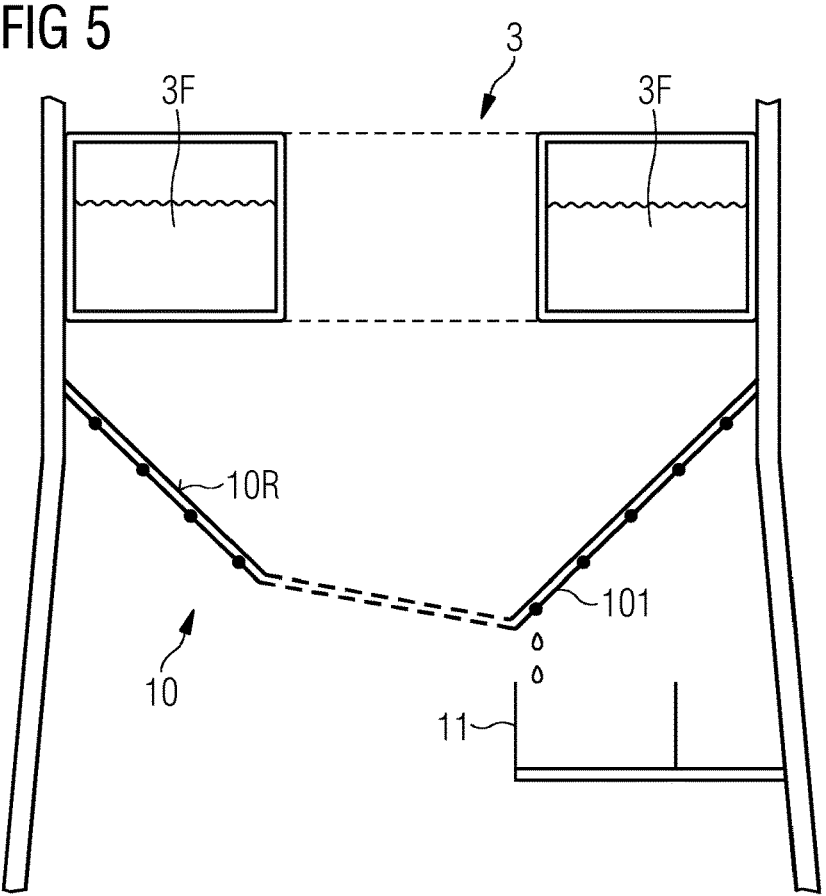
FIG. 5 shows another embodiment of a leak containment arrangement.

FIG. 4 and FIG. 5 illustrate a further way of realizing the fluid guide 10. FIG. 3 shows a top-down view, looking downward into the tower 20, while FIG. 4 shows a vertical cross-section. Here, a two-part configuration is shown, with a robust rope mesh 101 or net formed in the shape of a downward-pointing cone, to act as a support structure for a separate run-off surface 10R. The rope mesh 101 can be suspended from the tower wall as described above, for example using suitable hooks 14. A run-off surface 10R in the form of a similar-sized cone or funnel is arranged above the supporting rope mesh 101. FIG. 4 illustrates a step in which the run-off surface 10R is being unrolled to arrange it on top of the supporting mesh 101. The upper edge of the run-off surface 10R can be taped, riveted, stapled, or otherwise connected to the tower wall interior surface. Since the material of the run-off surface 10R does not need to bear any weight, it can be made of a favourably economical lightweight material. Instead of the symmetrical conical shape shown here, the fluid guide can have an asymmetrical shape as suggested in FIG. 1, to allow the receptacle 11 to be arranged nearer to the tower wall. The leak containment arrangement 1 may be assumed to also comprise a fluid return means as shown in FIG. 1.

Figure 6:
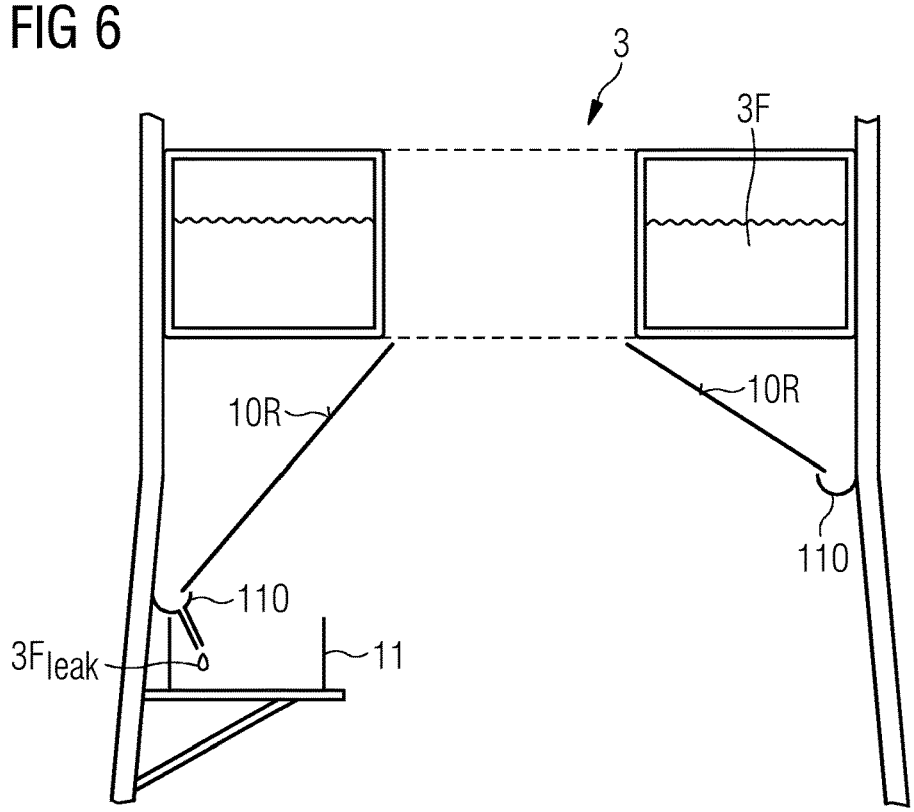
FIG. 6 shows another embodiments of a leak containment arrangement.

FIG. 6 shows an alternative way of realizing the fluid guide 10. Here, instead of having the shape of a downward-pointing cone as shown above in FIGS. 1-3, the fluid guide 10 has the shape of an upward-pointing cone. Any leaked liquid runs down the upper surface of the cone towards a narrow channel 110 (a gutter or trough) arranged about the interior surface of the tower wall, and formed to lead towards a receptacle 11. For example, the lower edge of the fluid guide 10 and the gutter can have the shape of an ellipse. The ellipse described by the gutter may be defined by an inclined plane intersecting with the tower. The circular upper edge of the fluid guide 10 can be secured to the inner wall of the damper 3 at its central opening, for example. The elliptical lower edge of the fluid guide 10 can be secured in any suitable way to an upper edge of the elliptical gutter 110. At its lowest point, the gutter 110 opens into a receptacle 11 as described above. The leak containment arrangement 1 may be assumed to also comprise a fluid return means as shown in FIG. 1.

Figure 7:
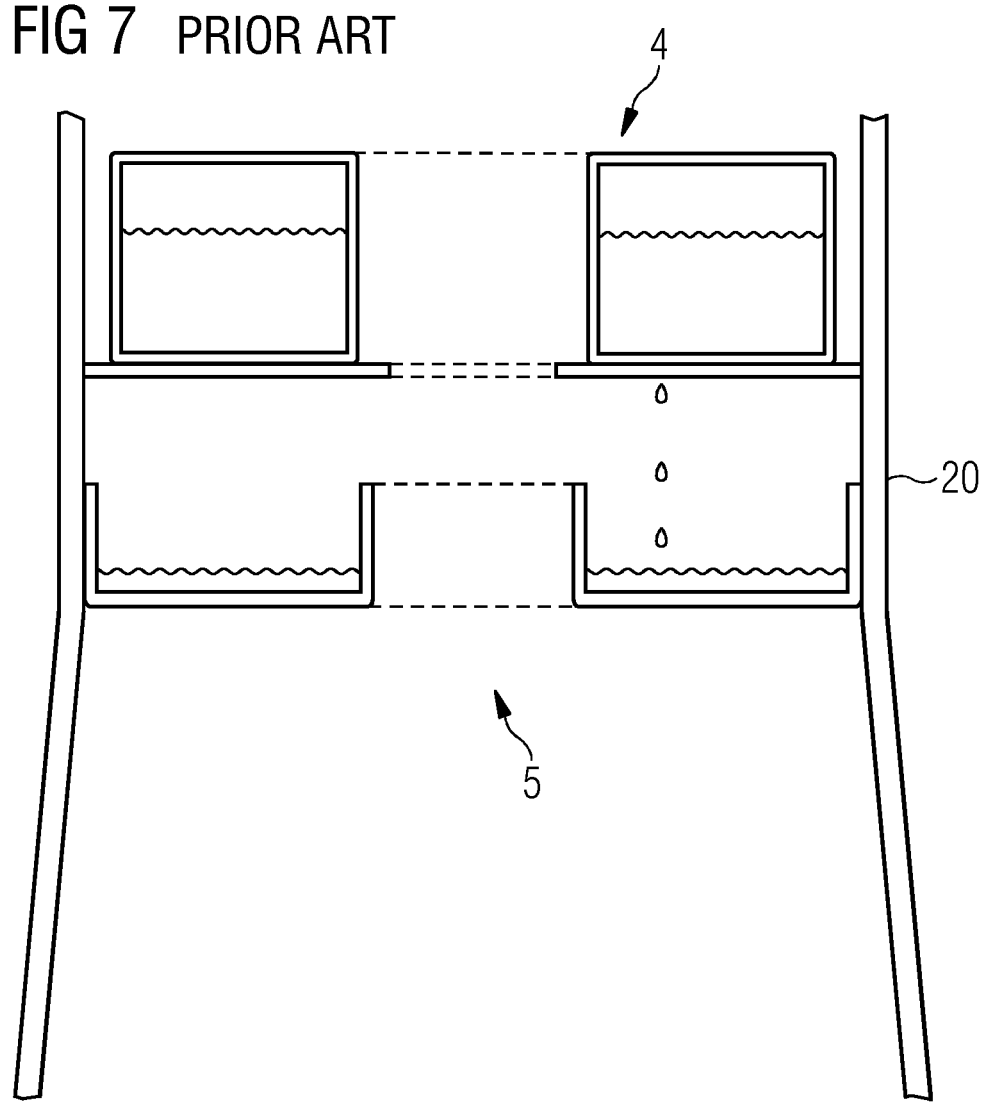
FIG. 7 shows a leak containment arrangement as known from the prior art.

FIG. 7 shows a cross-section through a wind turbine tower 20 as known from the prior art, showing a full-size slosh damper 4 arranged at an upper level in the tower 20. Similar to the wind turbine tower shown in FIG. 1, the capacity of the damper 4 can be in the order of 15,000 litres. To fulfil the requirements of secondary containment for the damper fluid, the damper 4 is arranged in a secondary containment tank 5.

Environmental regulations may require that the secondary containment tank 5 be constructed to contain the entire quantity of damper fluid in the event of a leak. However, the material costs of providing a containment tank that is large enough (and structurally strong enough) to contain such a quantity of fluid add significantly to the overall cost of manufacturing the wind turbine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A leak containment arrangement for a fluid damper in a wind turbine tower, comprising:
    a receptacle arranged below the fluid damper;
    a fluid guide arranged between the fluid damper and the receptacle, wherein the fluid guide is arranged to receive fluid from a leak in the fluid damper and to guide the fluid into the receptacle, wherein a projected surface area of the fluid guide contains a projected surface area of the fluid damper; and
    a sensing means arranged to detect the fluid in the receptacle.

2. The leak containment arrangement according to claim 1, wherein the sensing means is configured to issue an alarm when a level of collected fluid in the receptacle is detected and/or when the level of collected fluid in the receptacle rises faster than a predefined rate.

3. The leak containment arrangement according to claim 1, wherein a run-off surface of the fluid guide comprises any of: polyethylene, polyvinylchloride, polypropylene.

4. The leak containment arrangement according to claim 1, wherein a run-off surface of the fluid guide is in a shape of a downward-pointing cone.

5. The leak containment arrangement according to claim 1, wherein an outer edge of the fluid guide is secured to an interior surface of a tower wall.

6. The leak containment arrangement according to claim 1, wherein the fluid guide comprises a weight-bearing support structure and a fluid run-off surface arranged on the weight-bearing support structure.

7. The leak containment arrangement according to claim 6, wherein the support structure comprises a rope mesh in a form of a funnel.

8. The leak containment arrangement according to claim 1, further comprising a fluid return means for returning any collected fluid to the fluid damper.

9. The leak containment arrangement according to claim 8, wherein the fluid return means comprises a pump arranged to convey fluid through a return line to the fluid damper.

10. The leak containment arrangement according to claim 9, wherein the sensing means is configured to actuate the pump when fluid is detected in the receptacle.

11. A wind turbine comprising:
    a tower supporting a nacelle;
    a fluid damper arranged in an upper level of the tower; and
    the leak containment arrangement according to claim 1 arranged to collect fluid leaked from the fluid damper.

12. The wind turbine according to claim 11, wherein the fluid damper comprises a fluid-filled toroid with an outer diameter that corresponds to an inner diameter of the tower.

13. A leak containment arrangement for a fluid damper in a wind turbine tower, comprising:
   a receptacle arranged below the fluid damper;
   a fluid guide arranged between the fluid damper and the receptacle, wherein the fluid guide is arranged to receive fluid from a leak in the fluid damper and to guide the fluid into the receptacle, wherein the fluid guide comprises a weight-bearing support structure in a form of a funnel and a fluid run-off surface arranged on the weight-bearing support structure; and
   a sensing means arranged to detect the fluid in the receptacle.

14. A method of providing leak containment for a fluid damper in a wind turbine tower, comprising:
   arranging a receptacle below the fluid damper;
   arranging a fluid guide between the fluid damper and the receptacle to receive fluid from a leak in the fluid damper and to guide the fluid into the receptacle, wherein a projected surface area of the fluid guide contains a projected surface area of the fluid damper; and
   providing a sensing means for detecting the fluid in the receptacle.

15. The method according to claim 14, further comprising actuating a fluid return means when a level of fluid collected in the receptacle exceeds a threshold level.

* * * * *